United States Patent
Yang et al.

(10) Patent No.: US 11,505,238 B2
(45) Date of Patent: Nov. 22, 2022

(54) HANDWHEEL POSITION MEASUREMENT SYSTEM AND METHOD

(71) Applicant: Steering Solutions IP Holding Corporation, Saginaw, MI (US)

(72) Inventors: Kun Yang, Jiangsu (CN); Pierre C. Longuemare, Paris (FR); Eric D. Pattok, Frankenmuth, MI (US); Keith A. Kidder, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 277 days.

(21) Appl. No.: 16/807,953

(22) Filed: Mar. 3, 2020

(65) Prior Publication Data
US 2021/0276611 A1 Sep. 9, 2021

(51) Int. Cl.
*B62D 5/04* (2006.01)
*B62D 3/04* (2006.01)
*B62D 1/20* (2006.01)
*B62D 15/02* (2006.01)

(52) U.S. Cl.
CPC ............. *B62D 5/0421* (2013.01); *B62D 1/20* (2013.01); *B62D 3/04* (2013.01); *B62D 5/0463* (2013.01); *B62D 15/0225* (2013.01)

(58) Field of Classification Search
CPC .......... B62D 5/0421; B62D 1/20; B62D 3/04; B62D 5/0463; B62D 15/0225
See application file for complete search history.

(56) References Cited

U.S. PATENT DOCUMENTS

2016/0077528 A1 * 3/2016 Scholz ................. E05F 15/695
701/49

FOREIGN PATENT DOCUMENTS

| DE | 102012019428 A1 * | 4/2014 | ............... B62D 3/12 |
| EP | 1923299 A1 * | 5/2008 | ............... G01D 5/04 |
| JP | 2015077833 A * | 4/2015 | |
| WO | WO-2009100850 A1 * | 8/2009 | ........... B62D 5/0409 |
| WO | WO-2017072217 A1 * | 5/2017 | ........... B62D 5/0457 |
| WO | WO-2019025476 A1 * | 2/2019 | ............... B62D 6/10 |

* cited by examiner

*Primary Examiner* — Jacob D Knutson
(74) *Attorney, Agent, or Firm* — Dickinson Wright PLLC (57) ABSTRACT

A position measurement system for a steering system includes a steering shaft. The position measurement system also includes a worm gear coupled to the steering shaft. The position measurement system further includes a worm in meshed engagement with the worm gear, the worm driven by a motor. The position measurement system yet further includes a first sensor operatively coupled to the worm to detect an angular position of the worm and the motor that drives the worm. The position measurement system also includes a driving gear coupled to the steering shaft. The position measurement system further includes a spur gear in meshed engagement with the driving gear. The position measurement system yet further includes a second sensor operatively coupled to the spur gear to detect an angular position of the spur gear.

5 Claims, 8 Drawing Sheets

HANDWHEEL POSITION MEASUREMENT SYSTEM AND METHOD

FIELD OF THE INVENTION

The disclosure herein relates to steering systems and, more particularly, to a system and method for handwheel position measurement.

BACKGROUND OF THE INVENTION

In an electric power steering (EPS) system, it is desirable to obtain the position of the handwheel. This position may be used, for example, to cause the handwheel to return to center following a steering input or for other useful functions. The handwheel position sensor is divided into a relative position sensor and an absolute position sensor. The absolute position sensor can obtain the actual position of the steering wheel at the vehicle power-on stage. The absolute position sensor can also be used for EPS internal function and can be extended to other vehicle functions. The relative angle sensor structure is simple in comparison to the absolute position sensor, but cannot obtain the actual steering wheel angle immediately after the vehicle is started. Normally, a learning or calculation algorithm is required and the functionality is limited.

While an absolute position sensor seems desirable over a relative position sensor for the reasons discussed above, absolute handwheel position sensors are more costly, the structure is more complicated, and the size is larger, when compared to relative position sensors.

SUMMARY OF THE INVENTION

According to one aspect of the disclosure, a position measurement system for a steering system includes a steering shaft. The position measurement system also includes a worm gear coupled to the steering shaft. The position measurement system further includes a worm in meshed engagement with the worm gear, the worm driven by a motor. The position measurement system yet further includes a first sensor operatively coupled to the worm to detect an angular position of the worm and the motor that drives the worm. The position measurement system also includes a driving gear coupled to the steering shaft. The position measurement system further includes a spur gear in meshed engagement with the driving gear. The position measurement system yet further includes a second sensor operatively coupled to the spur gear to detect an angular position of the spur gear.

According to another aspect of the disclosure, a position measurement system for a steering system includes an input steering shaft. The position measurement system also includes an output steering shaft operatively coupled to the input steering shaft, the input steering shaft and the output steering shaft disposed on a steering column axis. The position measurement system further includes a gear arrangement driven by a motor disposed on a motor axis to provide a steering assist to the output steering shaft. The position measurement system yet further includes a first sensor located along the motor axis. The position measurement system also includes a second sensor located on the steering column axis.

According to yet another aspect of the disclosure, a method of measuring an angular position of a handwheel of a steering system is provided. The method includes measuring an angular position of a gear operatively coupled to an output steering shaft with a first sensor located on a steering shaft axis. The method also includes measuring an angular position of a worm with a second sensor, the worm engaged with a worm gear operatively coupled to the output steering shaft. The method further includes calculating an absolute position of the handwheel with a combination of the measured angular positions of the gear and the worm.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
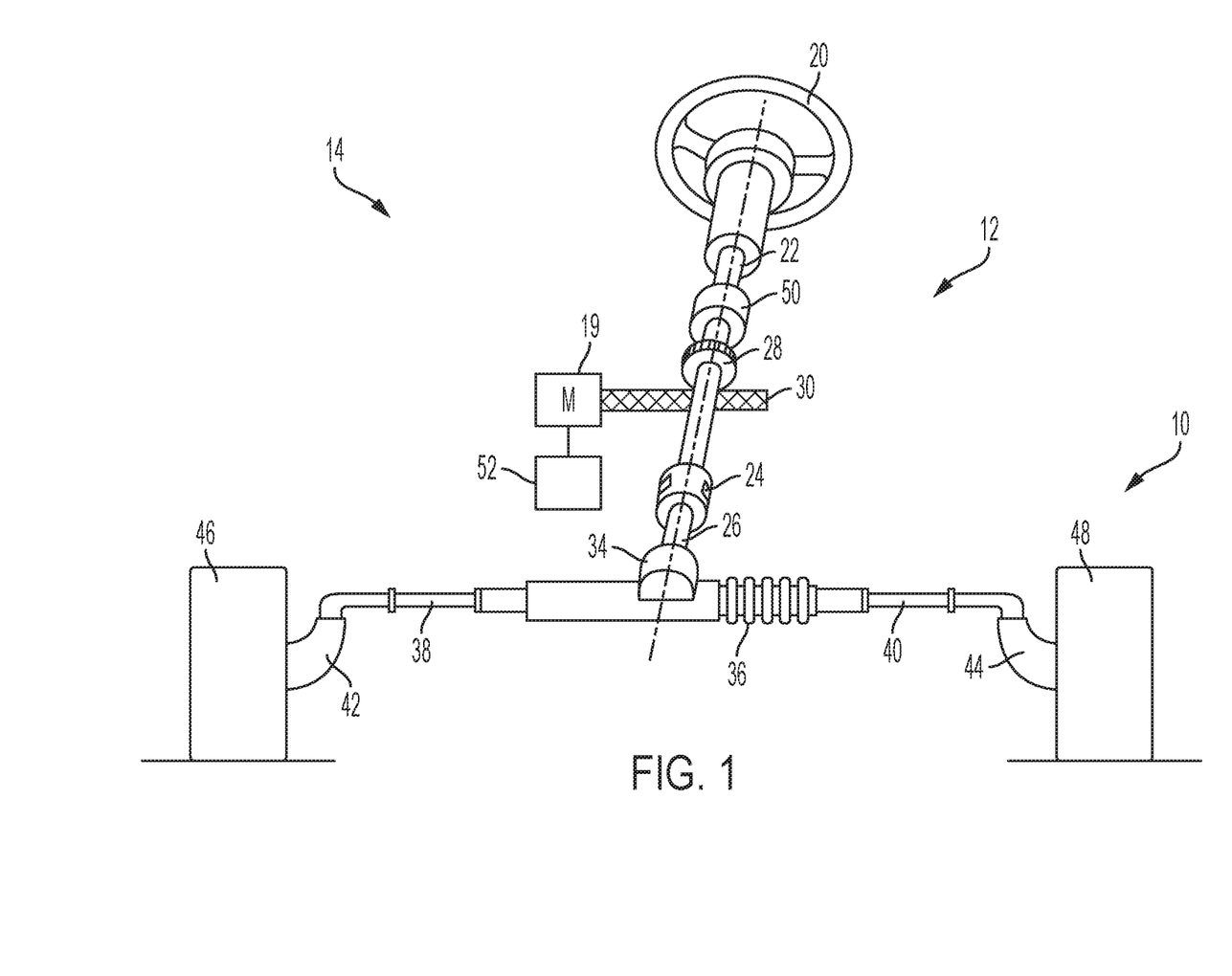
FIG. 1 is a schematic illustration of an exemplary steering system of a vehicle.

Referring now to the Figures, where the invention will be described with reference to specific embodiments, without limiting same, an exemplary embodiment of a vehicle 10 having a steering system 12 is illustrated in FIG. 1. The steering system 12 is provided to steer the vehicle 10 in a desired direction and generally includes a handwheel 20, an upper steering column 22, a universal joint 24, a lower steering column 26, a worm gear 28, a worm 30, a gear housing 34, a steering mechanism 36, tie rods 38, 40, steering knuckles 42, 44, and road wheels 46, 48.

In some embodiments, the steering system 12 is an electric power steering (EPS) system that utilizes a rack and pinion steering mechanism 36, which includes a toothed rack (not shown) and a pinion gear (not shown) located under gear housing 34. During operation, as the handwheel 20 is turned by a vehicle operator, the upper steering column 22 is connected to the lower steering column 26 and turns the pinion gear. Rotation of the pinion gear moves the toothed rack, which moves the tie rods 38, 40. The tie rods 38, 40 in turn move respective steering knuckles 42, 44, which turn the respective road wheels 46, 48.

It should be noted that the vehicle handwheel 20 has two predetermined steering travel limits. The first predetermined steering travel limit is a full clockwise steering travel limit. The second predetermined steering travel limit is a full counter-clockwise steering travel limit. The first and second predetermined steering travel limits can be quantified in angular degrees or radians. For example, handwheel 20 may rotate three full revolutions (or approximately 1080 degrees) or four full revolutions (or approximately 1440 degrees) between the first and second predetermined steering travel limits.

A position measurement system 14 is provided to assist in controlling the steering system 12 and to determine an absolute rotational position of the vehicle handwheel 20. The position measurement system 14 includes a column torque sensor 50, a controller 52, and a steering assist motor 58. The steering column torque sensor 50 is provided to generate a signal indicative of an amount of torque being applied to vehicle handwheel 20 and upper steering column 22 by a vehicle operator. In one exemplary embodiment, the torque sensor 50 includes a torsion bar (not shown) which outputs a variable-resistance to controller 52 based on an amount of twist of the torsion bar. Alternatively, other types of torque sensors known to those skilled in the art could be utilized.

The controller 52 is provided to generate control signals for controlling operation of the steering assist motor 58. The controller 52 is further configured to determine an absolute rotational position of the handwheel 20, as described herein in more detail. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
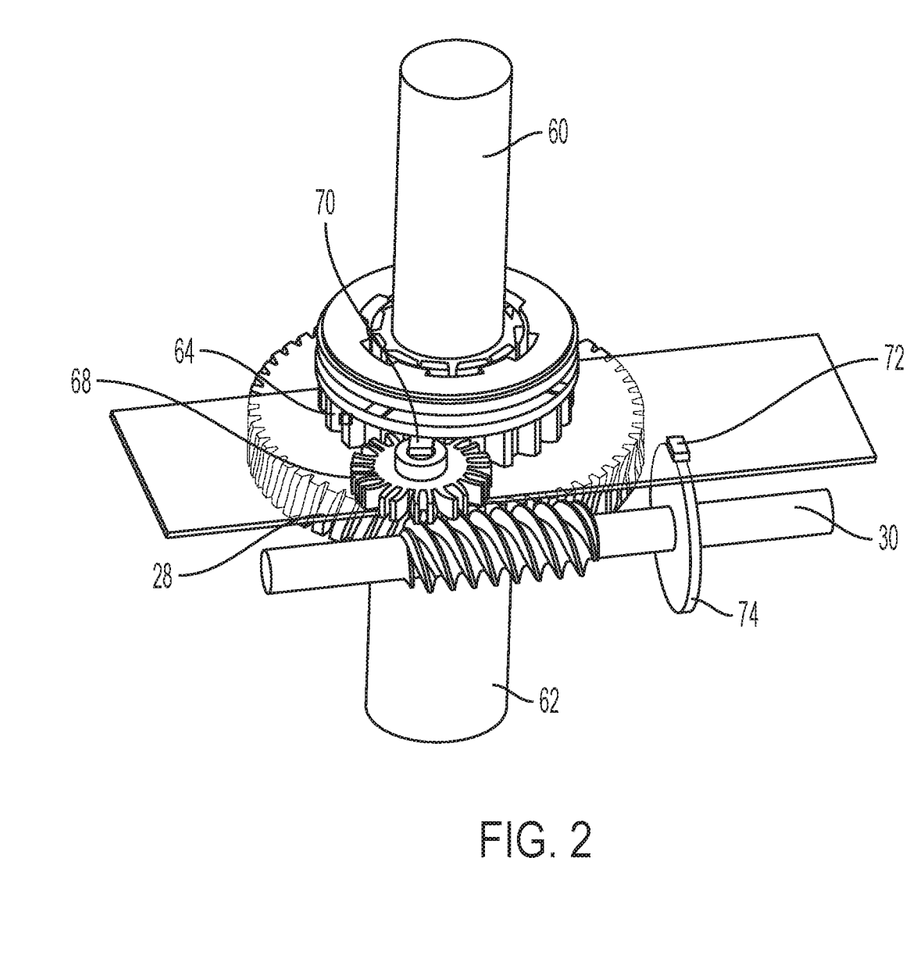
FIG. 2 is a perspective view of a handwheel position measurement system.

Referring now to FIG. 2, with continued reference to FIG. 1, illustrated is the portion of the steering system 12 where the position measurement system 14 is located. In particular, a first shaft 60 (e.g., input shaft) and a second shaft 62 (e.g., output shaft) are substantially coaxially aligned. The first shaft is configured to be operatively coupled to the handwheel 20 and the second shaft 62 is configured to be operatively coupled to an intermediate shaft. Multiple gears are operatively coupled to the second shaft 62. Specifically, a driving gear 64 is operatively coupled to the second shaft 62 at a first axial position. Due to the fixed relationship between the driving gear 64 and the second shaft 62, rotation of the second shaft 62 imparts corresponding rotation of the driving gear 64. The driving gear 64 is in meshed engagement with a spur gear 68.

The worm gear 28 is also operatively coupled to the second shaft 62 at a second axial position which is spaced from the axial position of the driving gear 64. The worm gear 28 and the driving gear 64 have different diameters. Due to the fixed relationship between the worm gear 28 and the second shaft 62, rotation of the second shaft 62 imparts corresponding rotation of the worm gear 28. The worm gear 28 is in meshed engagement with the worm 30. The motor 58 is configured to drive the worm 30, which is operably coupled to the worm gear 28 for moving the lower steering column 26, the steering mechanism 36, the tie rods 38, 40, and the knuckles 42, 44 toward an operational position wherein the road wheels 46, 48 have a desired front road wheel angle.

The embodiments disclosed herein provide a system and method for handwheel position measurement that reduces the sensor system complexity and cost. In particular, the position measurement system 14 includes a relative position sensor 70 and a motor position sensor 72. The relative position sensor 70 and the motor position sensor 72 may each be any suitable type of sensor(s) that can output a signal indicative of the angular position of the respective components to which they are coupled.

Figure 3:
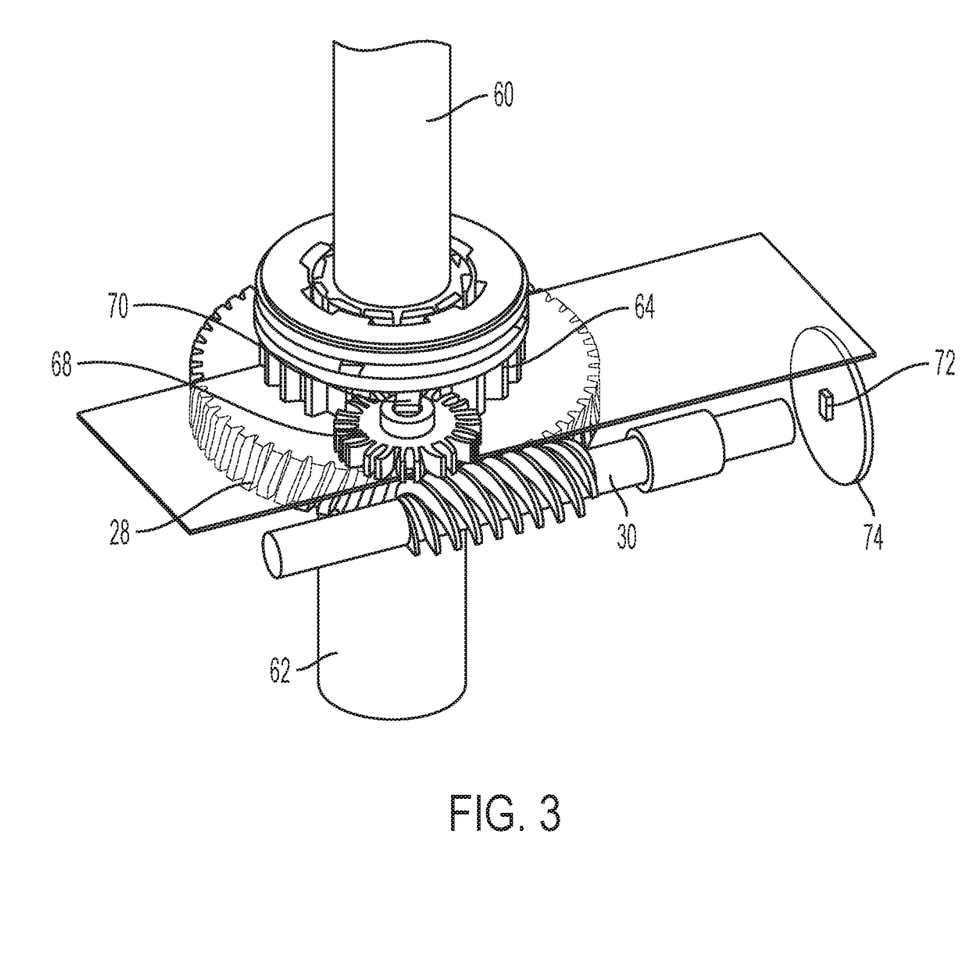
FIG. 3 is a perspective view of the handwheel position measurement system according to another aspect of the disclosure.

The relative position sensor 70 is located on the spur gear 68. The motor position sensor 72 is disposed on an outer diameter of a disk 74 that is fixedly coupled to the shaft of the worm 30 in the embodiment illustrated in FIG. 2. The motor position sensor 72 is disposed at an end of the shaft of the worm 30 and along a central axis of the disk 74 in the embodiment illustrated in FIG. 3. FIG. 3 may be referred to as a true "on motor axis" location in relation to the motor position sensor 72, while FIG. 2 may be referred to an "off motor axis" location. However, each of these detects the angular position of the worm 30, and therefore the motor position due to the fixed relationship of the motor and the worm 30. As appreciated from the disclosure herein, the position measurement system 14 includes one sensor that is substantially located on the handwheel axis and another sensor on—or just off—the motor axis (i.e., associated with worm 30 in position of FIG. 2 or 3). This advantageously allows a single gear (i.e., spur gear 68) to be used, thereby reducing the size of the system.

Figure 4:
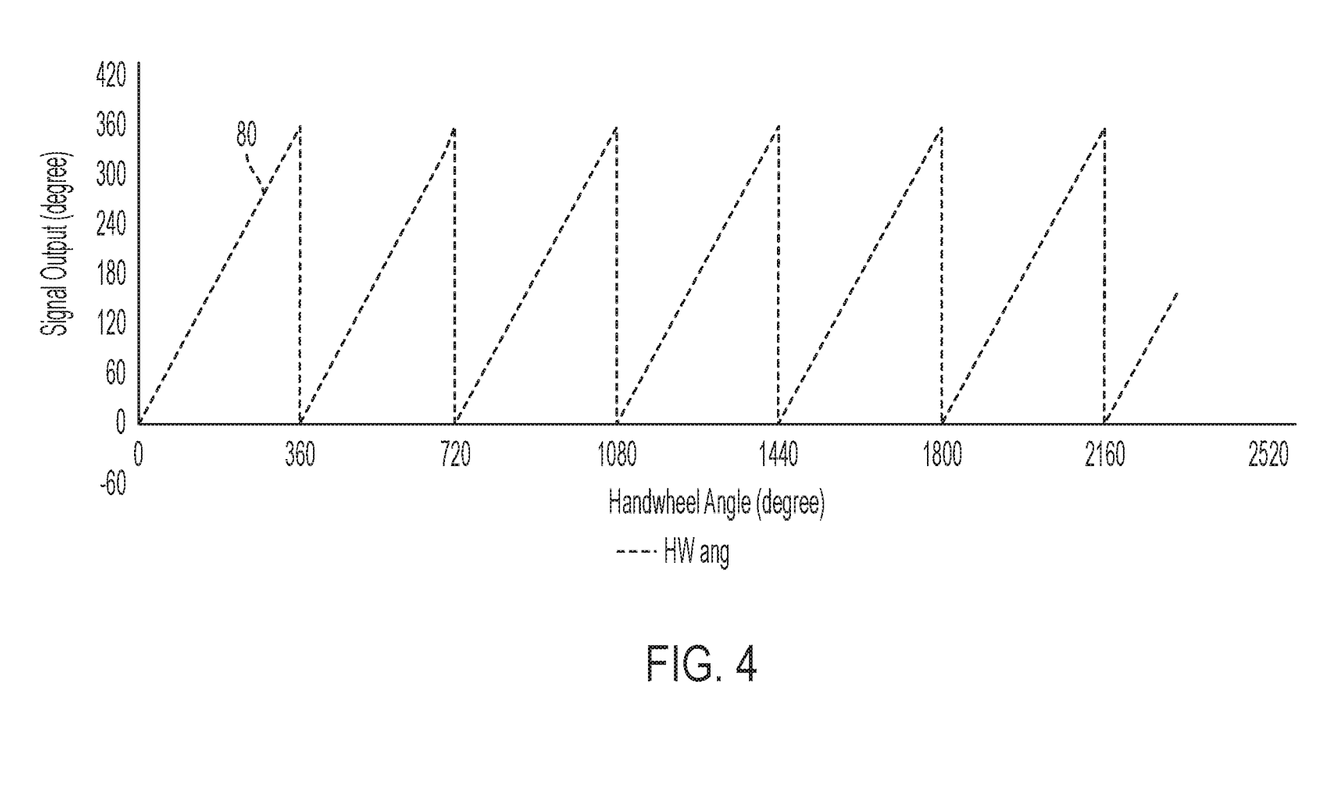
FIG. 4 is a plot of handwheel angle vs. a signal output of a first sensor.

As discussed above, the spur gear 68 is driven by the driving gear 64 which is attached to the second shaft 62. The spur gear 68 and the driving gear 64 have the same number of teeth, such that the spur gear 68 rotates one time for each revolution of shafts 60, 62. The relative position sensor 70 located on the spur gear 68 measures the angular position of the spur gear 68. FIG. 4 is a plot 80 of the signal output (in degrees) of the relative position sensor 70 vs. the handwheel angular position (in degrees). As shown, each 360 degree revolution of the spur gear 68 that is detected by the relative position sensor 70 is indicative of a full revolution of the handwheel 20. The pattern repeats for several revolutions in the illustrated plot. Although a 1:1 ratio is illustrated, it is to be appreciated that alternative ratios may be employed in different embodiments.

Figure 5:
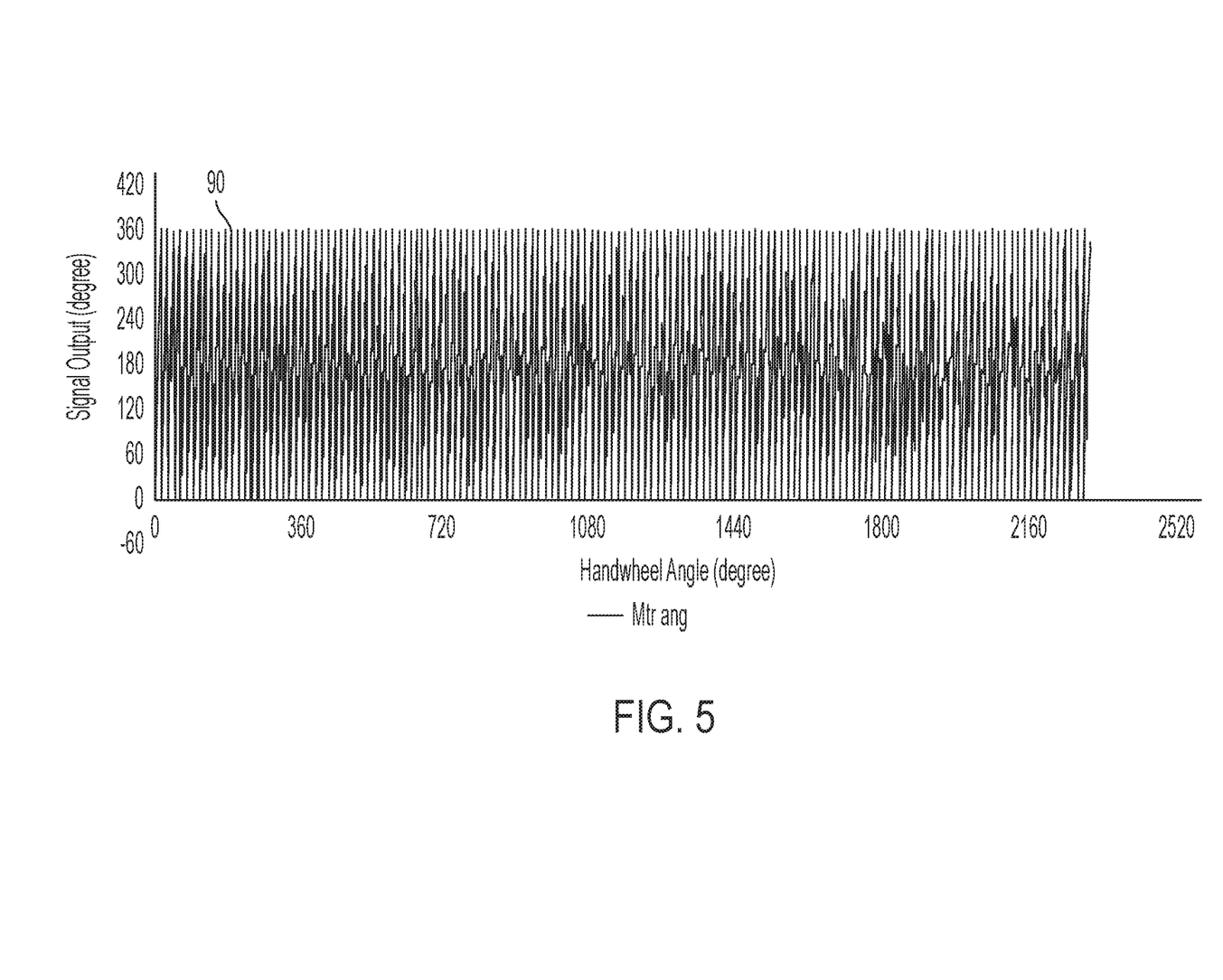
FIG. 5 is a plot of handwheel angle vs. a signal output of a second sensor.
Figure 6:
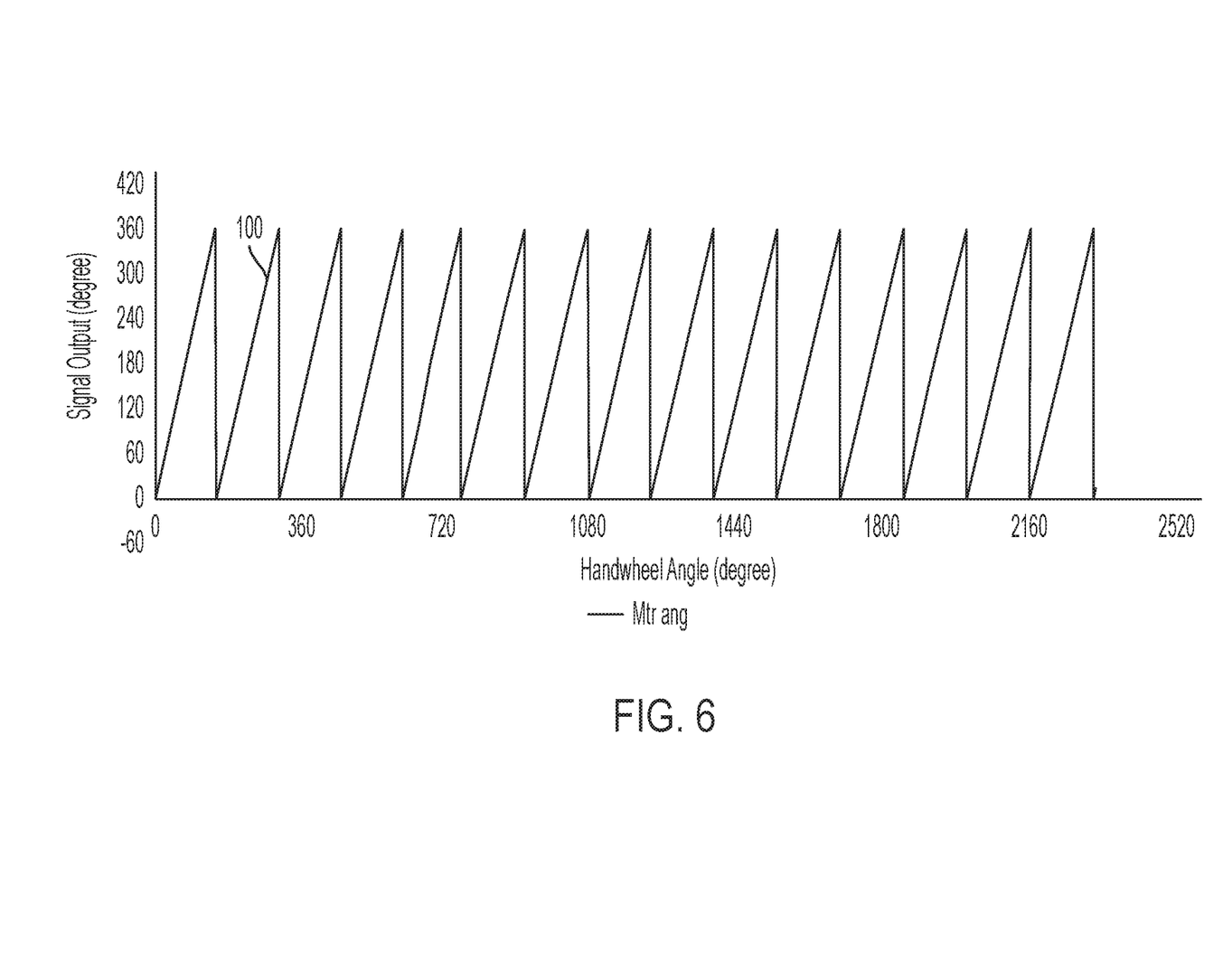
FIG. 6 is a plot of handwheel angle vs. a signal output of the second sensor according to another aspect of the disclosure.

The worm 30 is being driven by the worm gear 28, which is also attached to the second shaft 62. This gear combination can be configured such that the horizontal worm 30 rotates 22.3333 times for each revolution of the handwheel 20. The revolution ratio of 22.3333 is merely illustrative of one embodiment and it is to be appreciated that alternative ratios may be employed in other embodiments. The motor position sensor 72 on the disk 74 measures the angular position of the worm 30. FIG. 5 is a plot 90 of the signal output (in degrees) of the motor position sensor 72 vs. the handwheel angular position (in degrees). As shown, it takes 22.3333 full revolutions of the worm 30 detected by the motor position sensor 72 to indicate a full revolution of the handwheel 20. The pattern repeats for several revolutions in the illustrated plot. In fact, the plot is too dense to illustrate how the relationship between the relative position sensor 70 and the motor position sensor 72 can be combined. Therefore, for illustrative purposes, the plot of the motor position sensor 72 is modified in FIG. 6 to represent a 1.3333:1 ratio of worm 30 revolutions per handwheel revolution, with the plot referenced with numeral 100.

Figure 7:
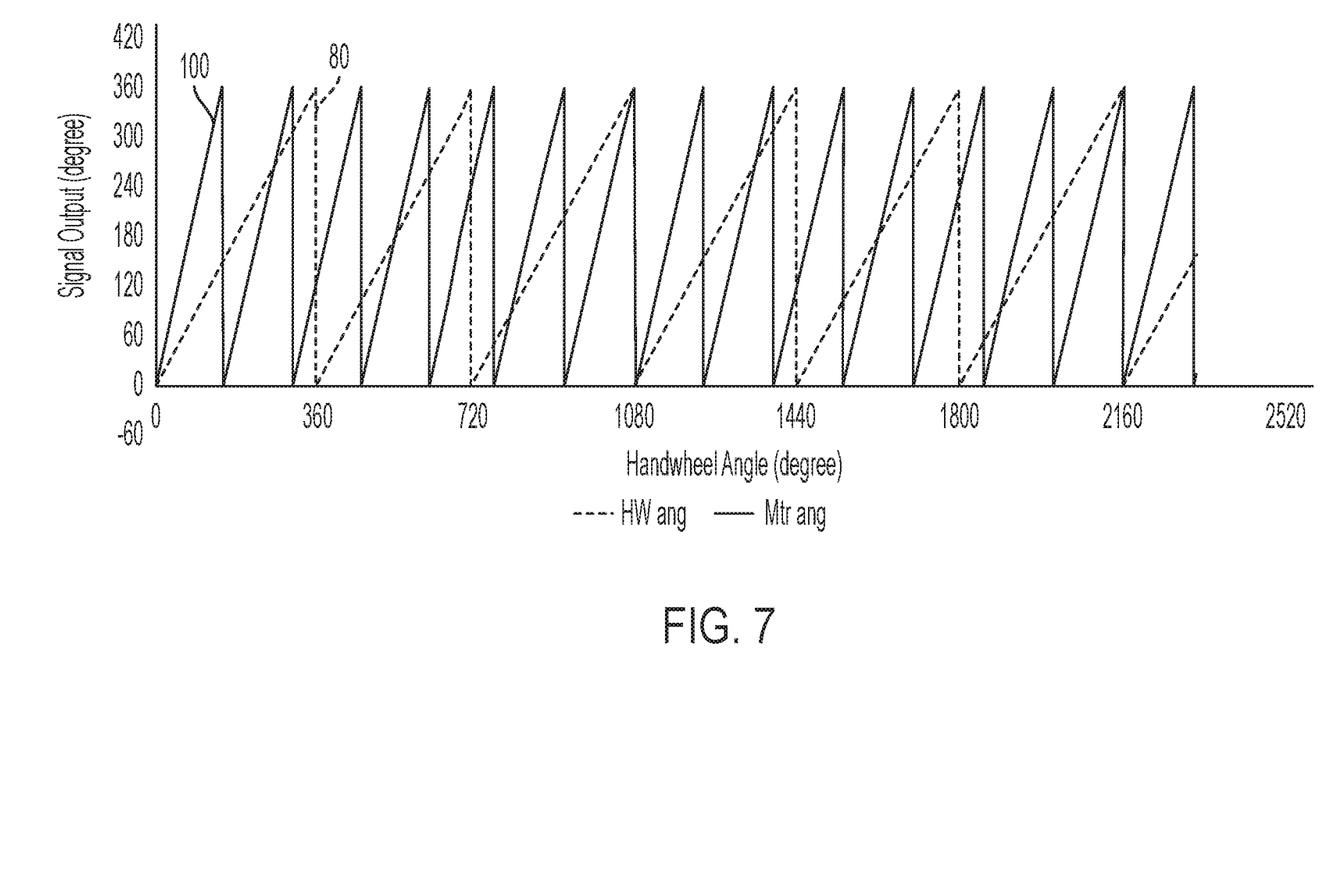
FIG. 7 is a plot of handwheel angle vs. the signal outputs of both sensors.
Figure 8:
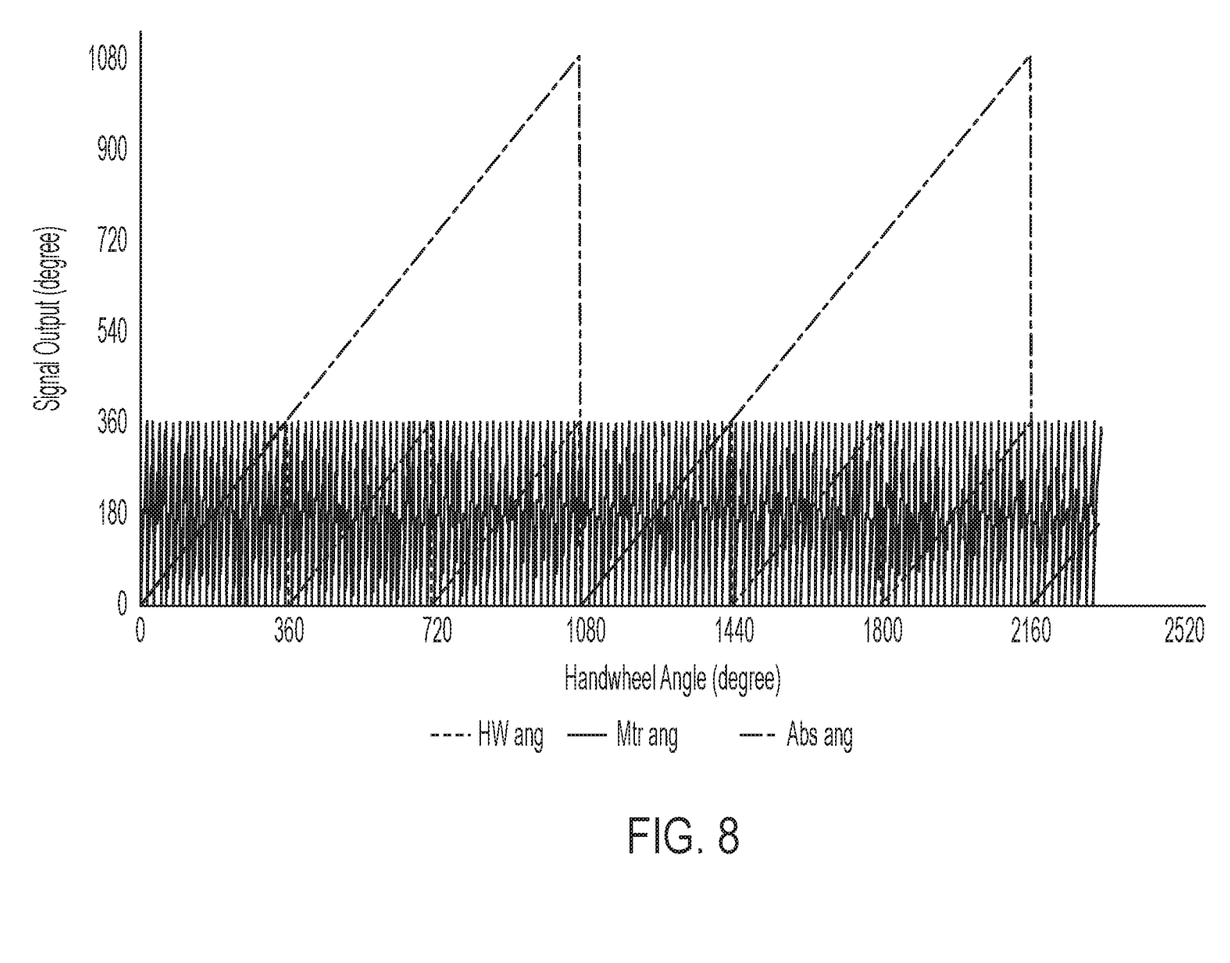
FIG. 8 is a plot of handwheel angle vs. the signal outputs of both sensors representing an absolute handwheel angle.

FIG. 7 illustrates a combination of plots 80 and 100. As shown, a pattern repeats every three (3) revolutions of the handwheel 20. The same is true with a 22.3333:1 ratio, but it is much more difficult to visualize, as discussed above. Because there is a unique relationship between the signals of the relative position sensor 70 and the motor position sensor 72, an algorithm that converts these two signals into an absolute steering wheel position over three (3) steering wheel revolutions may be utilized to determine the absolute handwheel position, as represented by FIG. 8. Although an absolute range of three revolutions is described above, the system can be expanded to more revolutions in other embodiments, if needed and practical.

The controller 52 may include one or more algorithms to calculate the absolute handwheel angle as a function of the signals detected by the relative position sensor 70 and the motor position sensor 72, as described above.

As disclosed herein, the system and method for detecting an absolute angular position of a handwheel is provided to reduce the sensor complexity, size and cost. The unique worm gear position is calculated based on the relative worm gear and worm position, which is based on a non-integer worm/gear ratio, and proper driving gear/spur gear ratio. Since the worm gear arrangement 28, 30 is coupled to the handwheel 20, it is equal to handwheel absolute position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A position measurement system for a steering system comprising:
    a steering shaft;
    a worm gear coupled to the steering shaft;
    a worm in meshed engagement with the worm gear, the worm driven by a motor;
    a first sensor operatively coupled to the worm to detect an angular position of the worm and the motor that drives the worm;
    a driving gear coupled to the steering shaft and located on a first side of the worm gear;
    a single spur gear in meshed engagement with the driving gear, the single spur gear located on the first side of the worm gear wherein the position measurement system does not include a second spur gear on a second side opposite the first side of the worm gear; and
    a second sensor operatively coupled to the spur gear to detect an angular position of the spur gear.

2. The position measurement system of claim 1, further comprising a disk operatively coupled to the worm, wherein the first sensor is operatively coupled to an outer diameter of the disk.

3. The position measurement system of claim 1, wherein the first sensor is operatively coupled to an end of the worm.

4. The position measurement system of claim 1, wherein one full revolution of the steering shaft results in one full revolution of the spur gear.

5. The position measurement system of claim 1, wherein one full revolution of the steering shaft corresponds to 22.3333 revolutions of the worm.

* * * * *